United States Patent
Phan et al.

(10) Patent No.: US 11,010,281 B1
(45) Date of Patent: May 18, 2021

(54) SYSTEMS AND METHODS FOR LOCAL RANDOMIZATION DISTRIBUTION OF TEST DATASETS

(71) Applicant: Coupang Corp., Seoul (KR)

(72) Inventors: Ngoc-Lan Isabelle Phan, Burlingame, CA (US); Beibei Ye, Fremont, CA (US); Chul Seo, San Carlos, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/068,529

(22) Filed: Oct. 12, 2020

(51) Int. Cl.
*G06F 11/00* (2006.01)
*G06F 11/36* (2006.01)

(52) U.S. Cl.
CPC ...... *G06F 11/3664* (2013.01); *G06F 11/3688* (2013.01)

(58) Field of Classification Search
CPC .................... G06F 11/3664; G06F 11/3688
See application file for complete search history.

(56) References Cited

U.S. PATENT DOCUMENTS

| | | | | | |
|---|---|---|---|---|---|
| 5,675,731 | A | * | 10/1997 | Fuller ................. | G06F 11/3684 714/38.13 |
| 2007/0214391 | A1 | * | 9/2007 | Castro ................. | G06F 11/3688 714/38.14 |
| 2015/0100829 | A1 | * | 4/2015 | Nanjundappa ...... | G06F 11/3688 714/38.1 |
| 2015/0100830 | A1 | * | 4/2015 | Nanjundappa ...... | G06F 11/3688 714/38.1 |
| 2015/0100831 | A1 | * | 4/2015 | Nanjundappa ...... | G06F 11/3684 714/38.1 |
| 2015/0100832 | A1 | * | 4/2015 | Nanjundappa ...... | G06F 11/3664 714/38.14 |
| 2017/0147480 | A1 | * | 5/2017 | Lachwani ........... | G06F 11/3664 |
| 2019/0034323 | A1 | * | 1/2019 | M ............................ | G06F 8/75 |
| 2019/0196952 | A1 | * | 6/2019 | Manchiraju ............ | G06N 3/088 |
| 2019/0391904 | A1 | * | 12/2019 | Sabharwal ................ | G06F 8/65 |
| 2020/0117580 | A1 | * | 4/2020 | Lekivetz ............. | G06F 11/3684 |
| 2020/0310948 | A1 | * | 10/2020 | Culibrk ................... | A63F 13/70 |

\* cited by examiner

*Primary Examiner* — Joshua P Lottich
(74) *Attorney, Agent, or Firm* — Finnegan, Henderson, Farabow, Garrett & Dunner, LLP

(57) ABSTRACT

Disclosed herein are systems and methods for a system for distributing user requests. The system may comprise a memory storing instructions and at least one processor configured to execute instructions to perform operations. These operations may comprise receiving from a local network device, without requesting, a data randomization scheme determining a test dataset from among a plurality of test datasets for deployment at a client device; based on the received data randomization scheme, determining test participation data for transmitting to a plurality of client devices; transmitting the test participation data to the plurality of client devices; transmitting, to the plurality of client devices, datasets configured for deployment by the plurality of client devices according to the test participation data; and receiving, from at least one of the plurality of client devices, interaction data associated with one of the datasets deployed by the at least one client device according to the test participation data.

20 Claims, 5 Drawing Sheets

SYSTEMS AND METHODS FOR LOCAL RANDOMIZATION DISTRIBUTION OF TEST DATASETS

TECHNICAL FIELD

Exemplary embodiments generally relate to systems and methods for distributing datasets using a local randomization scheme. For example, disclosed techniques may include receiving a randomization scheme and transmitting a test dataset to a client device. Other techniques may include transmitting a sub-test dataset based on interaction data received from a client device.

BACKGROUND

Conventional data testing systems typically rely on a format for distributing datasets to be tested at devices of users. Often, ways of distributing these datasets are determined by a server, which can strain the computing resources of the server and delay the transmission of datasets to user devices, leading to low throughput. In many cases, these conventional techniques use REST API calls between client-facing and non-client-facing services to assign a user to a particular test group. These constant API calls require considerable bandwidth and can further delay throughput of feedback to the testing service device.

Moreover, in some situations, current systems send testing data to irrelevant devices. For example, testing data for changing one aspect of a user interface may be sent to a user device when earlier testing data already removed that aspect entirely. This can lead to a waste of network resources for transmitting and receiving obsolete testing data, as well as a waste of storage space on a user device that stores it. In some cases, software crashes could also happen as a result. Finally, some conventional techniques involve sending testing data to very large numbers of devices and in some cases a vast majority of available testable devices. This can lead to fewer options of user devices to which subsequent test data can be sent, if such test data would be irrelevant or obsolete. In some cases, a rollback of test data may be necessary, further consuming network resources.

In view of these deficiencies of conventional user interface systems, there is a need for improved systems and methods for distributing test data. The disclosed system and methods address one or more of the problems set forth above and/or other problems in the prior art.

SUMMARY

Consistent with the present embodiments, one aspect of the present disclosure is directed to a system for distributing user requests. The system may comprise a network interface; at least one processor; and a non-transitory computer-readable medium containing a set of instructions that, when executed by the at least one processor, cause the at least one processor to perform operations. The operations may comprise receiving from a local network device, without requesting, a data randomization scheme determining a test dataset from among a plurality of test datasets for deployment at a client device; based on the received data randomization scheme, determining test participation data for transmitting to a plurality of client devices; transmitting the test participation data to the plurality of client devices; transmitting, to the plurality of client devices, datasets configured for deployment by the plurality of client devices according to the test participation data; and receiving, from at least one of the plurality of client devices, interaction data associated with one of the datasets deployed by the at least one client device according to the test participation data.

In accordance with further embodiments, the data randomization scheme is transmitted according to a defined periodicity.

In accordance with further embodiments, the server is configured to receive the interaction data using a listener.

In accordance with further embodiments, the test participation data is configured to be implemented by a client application.

In accordance with further embodiments, the transmitted test datasets are associated with a test and the operations further comprise selecting the test from among a plurality of mutually exclusive tests.

In accordance with further embodiments, the transmitted test datasets are configured to track a user identifier or a device identifier, associated with the at least one of the plurality of client devices.

In accordance with further embodiments, the plurality of client devices is a first plurality and the operations further comprise: selecting the first plurality of client devices; and preventing the transmission of the test datasets to a second plurality of client devices.

In accordance with further embodiments, preventing the transmission of the transmitted test datasets comprises: determining device or user identifiers associated with the second plurality of client devices; and removing the determined device or user identifiers from a list of identifiers designated as a destination list for the transmission of the transmitted test datasets.

In accordance with further embodiments, the first plurality is selected based on network traffic information.

In accordance with further embodiments, the test is a first test; and preventing the transmission is based on the second plurality of client devices being designated as a holdout group.

In accordance with further embodiments, the first test is associated with at least one sub-test, and the operations comprise transmitting sub-test datasets configured for deployment by the first plurality of client devices and associated with the at least one sub-test to the first plurality of client devices.

In accordance with further embodiments, the interaction data is first interaction data, and the operations further comprise receiving, from the at least one of the first plurality of client devices, second interaction data associated with one of the sub-test datasets deployed by the at least one client device.

In accordance with further embodiments, the operations further comprise: aggregating the first and second interaction data; and providing the first and second interaction data within a user interface.

In accordance with further embodiments, the test is a first test; and preventing the transmission is based on a second test being queued for sending to the second plurality of client devices In accordance with further embodiments, the operations further comprise determining the second test to conflict with the first test.

In accordance with further embodiments, the transmitted test datasets comprise data to be displayed at displays of the first plurality of client devices.

In accordance with further embodiments, the first and second tests are both associated with an application at the first and second pluralities of client devices.

In accordance with further embodiments, the interaction data indicates a degree of user interaction with one of the transmitted test datasets deployed at the at least one client device.

Consistent with the present embodiments, a second aspect of the present disclosure is directed to a method for distributing user requests. The method may comprise receiving, at a first local network device and from a second local network device, without requesting, a data randomization scheme determining a test dataset from among a plurality of test datasets for deployment at a client device; based on the received data randomization scheme, determining test participation data for transmitting to a plurality of client devices; transmitting the test participation data to the plurality of client devices; transmitting, to the plurality of client devices, datasets configured for deployment by the plurality of client devices according to the test participation data; and receiving, from at least one of the plurality of client devices, interaction data associated with one of the datasets deployed by the at least one client device according to the test participation data.

Consistent with other disclosed embodiments, exemplary embodiments of non-transitory computer readable storage media may store program instructions, which may be executed by at least one processor device and perform any of the methods described herein.

The foregoing general description and the following detailed description provide exemplary embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosure is generally directed to automated systems and processes for coordinating the analysis, transmission, and management of test datasets.

Reference will now be made in detail to exemplary embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
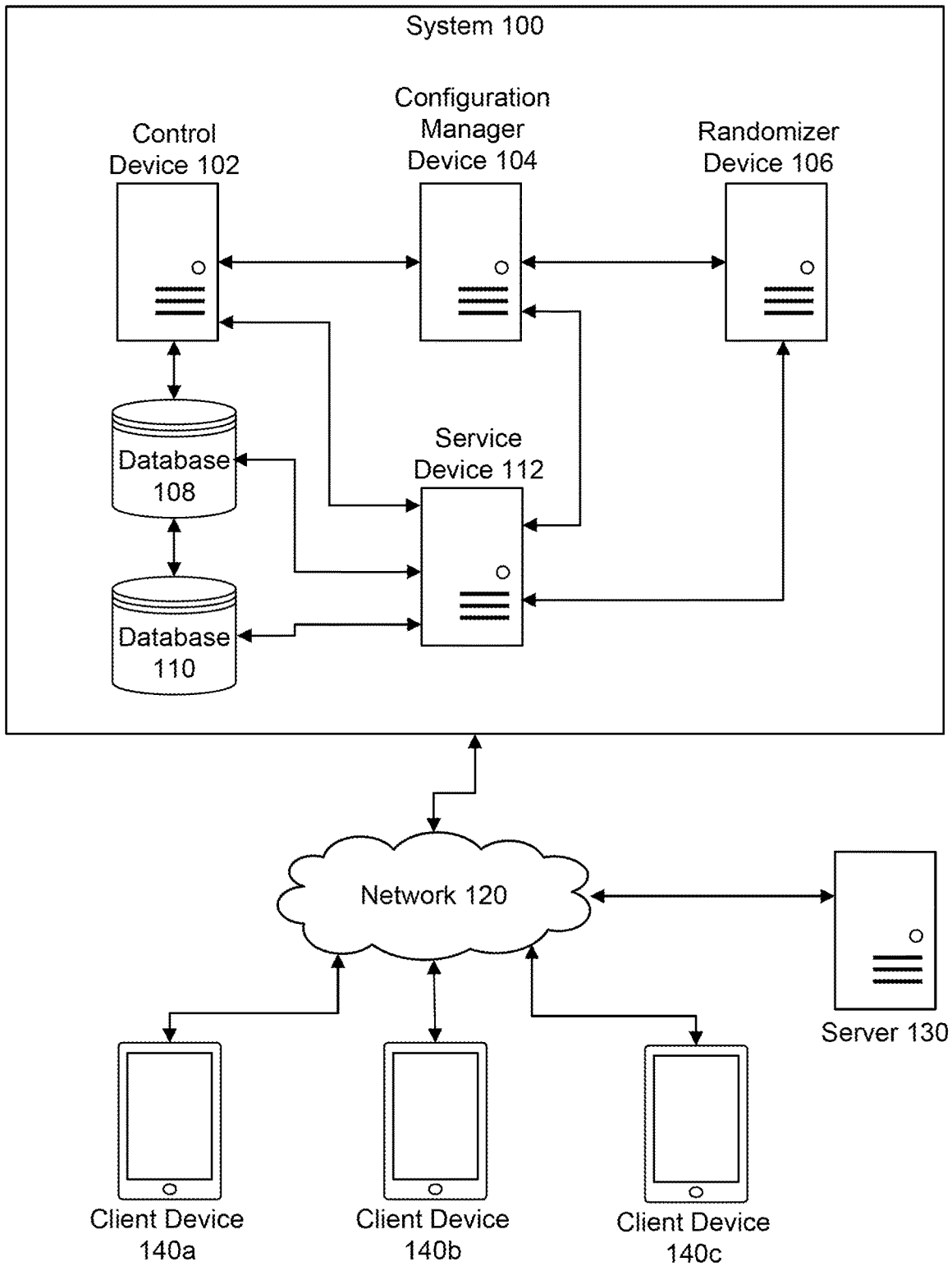
FIG. 1 illustrates an exemplary pictographic representation of a network architecture, consistent with disclosed embodiments.

FIG. 1 illustrates an exemplary pictographic representation of network architecture 10, which may include a system 100. System 100 may include computing devices configured to carry out processes discussed herein. In some embodiments, computing device 100 may be associated with a software developer, company, and/or other entity involved with creating user interfaces or other data for user applications or devices. In some embodiments, system 100 may include multiple computing devices communicably connected to each other within a local network (e.g., through a network interface). For example, system 100 may include a control device 102, which may control the transmission of data to other devices (e.g., client devices 140a 140b, and 140c). In some embodiments, control device 102 (or another device of system 100) may not communicate directly with a client device. Instead, direct client device communications may be handled by a client-facing service implemented by another device (e.g., service device 112). Such arrangements may help to reduce communication load on certain system devices (e.g., control device 102), while still allowing for reliable communication with client device. In some embodiments, control device 102 may save test information to a database, such as database 108 or database 110. Control device 102 may also update testing definitions or distribution schemes, which may be maintained at configuration manager device 104 (e.g., Apache Zookeeper device), either instead of, or in addition to, being maintained at other devices.

System 100 may also include configuration manager device 104, which may maintain testing definitions or distribution schemes. In some embodiments, configuration manager device 104 may listen for testing definitions that may be received from another device, such as randomizer device 106, or another device within or outside of system 100. Configuration manager device 104 may also configure testing definitions or randomization schemes, which may be transmitted (e.g., by service device 112) to other devices, such as client device 140a.

System 100 may also include randomizer device 106, which may generate randomization schemes for determining data distributions. In some embodiments, randomization schemes may include rules, probabilities, algorithms, and/or parameters that a client device may use to determine how to interact with received data (e.g., whether to generate a visual element at a client device using test data). For example, a randomization scheme may include a probability that a client device implements particular test data. In this manner, test data may be randomly distributed using a randomization scheme that is local to a client-facing service (e.g., operated by service device 112). In some embodiments, randomizer device 106 may receive randomized test participation data from an adapter device (not shown), which may be remote from system 100. For example, an adapter may be a centralized device for ensuring consistency among randomization schemes. For example, a modification to a randomization scheme may be made by a user at a device (e.g., control device 102), which may be transmitted to configuration manager device 104. In some embodiments, configuration manager device 104 may propagate the modification and/or modified scheme to at least one randomizer device 106 and/or an adapter (not shown) for generating appropriate randomization schemes for client devices. In some embodiments, configuration manager device 104 may propagate a randomization scheme, test data, etc. to another device (e.g., control device 102, service device 112), which may perform an assignment randomization (e.g., determining which test data to transmit to which client) locally (e.g., using a client of configuration manager device 104), which may reduce a number of communications (e.g., API calls) between devices within system 100, while still allowing for distribution of tests to client devices. In some embodiments, randomizer device 106 and/or an adapter (not shown) may log test participation of client devices (e.g., data received from client devices 140a, 140b, and/or 140c indicating whether an associated device has participated, and/or is participating in, a particular test).

System 100 may include a database 108 and/or database 110, which may store and/or organize data, to carry out processes discussed herein. For example, database 108 may store test information received from control device 102. As another example, database 110 may store test participation logs, which may be received from another device, such as server 130. In some embodiments, database 110 may store and/or send result data (e.g., result data determined from test participation logs) to database 108 for storage.

Network architecture 10 may also include network 120, which devices (e.g., service device 112 and client device 140c) may use to connect to each other (e.g., to send and/or receive communications). Network 120 may be one or more public or private networks and may include, for example, one or more wired or wireless networks, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 120 may be connected to other networks (not depicted in FIG. 1) to connect the various system components to each other and/or to external systems or devices. In some embodiments, network 120 may be a secure network and require a password to access the network.

Figure 2:
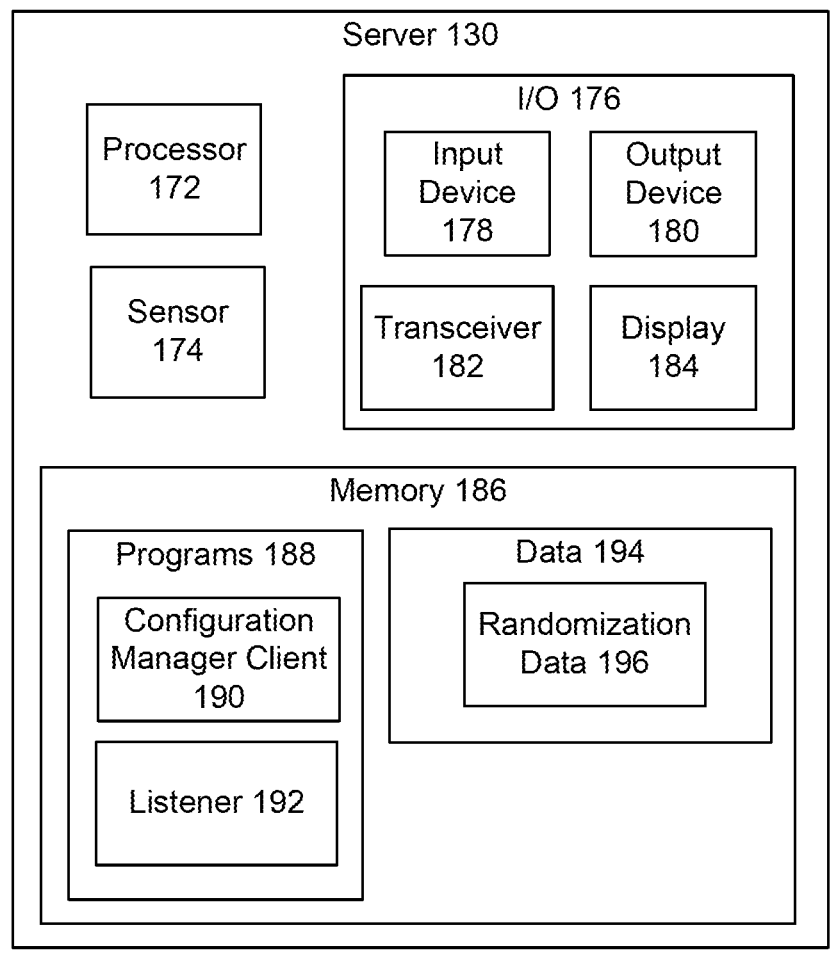
FIG. 2 illustrates an exemplary pictographic representation of a server, consistent with disclosed embodiments.

Network architecture 10 may also include server 130, discussed further with respect to FIG. 2. In some embodiments, server 130 may process test log data. For example, server 130 may receive test log participation data from an adapter, a client device, and/or randomizer device 106. In some embodiments, server 130 may transmit test log participation to a database, such as database 110. In some embodiments, server 130 may be part of a distributed messaging system.

In some embodiments, test participation logs may include interaction data from a client device. Interaction data may express how a user interacted with a user interface at a client device (e.g., client device 140b). For example, interaction data may indicate a number of user inputs to a user interface, a number of user inputs within an application, a frequency of input, an amount of screen time spent viewing a particular user interface, a type of user input on a user interface (e.g., a selection to transmit a purchase request), and/or that a user did not interact with a user interface. In some embodiments, interaction data may be associated with particular test data or/and sub-test data, which a client device may have used to re-configure user interfaces. As described elsewhere herein, test data and/or sub-test data may be implemented on a client device according to a randomization scheme. In some embodiments, server 130 may re-format and/or compile test participation log data before sending it to another device.

Network architecture 10 may also include client devices, such as client device 140a, client device 140b, and client device 140c. A client device may be an instance of device 150, described with respect to FIG. 3. In some embodiments, a client device may be a smartphone, smartwatch, personal computer, laptop, or other computing device associated with a user. In some embodiments, a client device may have a unique identifier, which may be accessible only to particular applications (e.g., a user account identifier associated with a program for implementing test data on a client device), or may be accessible to a non-exclusive list of applications (e.g., a MAC address, IP address, serial number, etc.).

FIG. 2 illustrates an exemplary pictographic representation of a server 130. In some embodiments, other devices (e.g., devices of system 100), such as control device 102, configuration manager device 104, randomizer device 106, and/or service device 112 may include any or all of the aspects of server 130. Server 130 may include a processor 172, which may include one or more dedicated processing units, application-specific integrated circuits (ASICs), field-programmable gate arrays (FPGAs), graphical processing units, or various other types of processors or processing units coupled with memory 186. Processor 172 may constitute a single-core or multiple-core processor that executes parallel processes simultaneously. For example, processor 172 may be a single-core processor configured with virtual processing technologies. In some embodiments, processor 172 may use logical processors to simultaneously execute and control multiple processes. Processor 172 may implement virtual machine technologies, or other known technologies to provide the ability to execute, control, run, manipulate, store, etc., multiple software processes, applications, programs, etc. In another embodiment, processor 172 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 172 may execute various instructions stored in memory 186 to perform various functions of the disclosed embodiments described in greater detail below. Processor 172 may be configured to execute functions written in one or more known programming languages. In some embodiments, server 130 may implement at least one service, which may be client-facing (e.g., configured for communicating directly to a client device, such as a product information service, ad delivery service, etc.) or non-client-facing (e.g., configured to not communicate directly to a client device, communicate to a client device only through an intervening service, etc., such as an experimental service, data analytics service, machine learning service, etc.).

Server 130 may also include a sensor 174, such as a location sensor, touch sensor, or the like. Server 130 may also include I/O 176, which may include at least one of a display 184 (e.g., graphical display, textual display, LED display, LCD display, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver (e.g., transceiver 182), an input device (e.g., input device 178), an output device (e.g., output device 180), or other I/O device to perform methods of the disclosed embodiments. I/O 176 may include components of an interface (e.g., a user interface). I/O 176 may also include a network interface (not shown), which may include at least one of a wired or wireless network card/chip set. For example, input device 178 may include a touch sensor, a mouse, a keyboard, or any device configured to allow for user input to server 130. As another example, output device 178 may include a speaker, display, haptic feedback device, or other device configured to produce output from server 130 to a user. Transceiver 182 may include a pluggable and/or optical transmission transceiver.

Server 130 may also include memory 186, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 186 may include any number of hard disks, random access memories (RAMs), read-only memories (ROMs), erasable programmable read-only memories (EPROMs or Flash memories), and the like. Memory 186 may include one or more storage devices configured to store instructions usable by processor 172 to perform functions related to the disclosed embodiments. Memory 186 may also include any number of programs, applications, application program interfaces (APIs), or any other data, consistent with the disclosed embodiments.

In some embodiments, memory 186 may store programs 188, which may include one or more programs (e.g., APIs, processes, modules, code, scripts, or functions) used to perform methods consistent with disclosed embodiments. For example, programs 188 may include a configuration manager client 190, which may, for example, manage configuration and/or transmission of randomization schemes, test participation data, etc. Programs 188 may also include a listener 192, which may listen for interaction data, data from a specific device, data from a specific subset of devices, particular test participation data, a particular test dataset, and/or particular sub-test data. Programs 188 may be written in one or more programming or scripting languages.

Memory 186 may also maintain data 194, which may include data associated with a user account, an application, a particular device, a model, a communication, or any other data related to testing data. Data may be exchanged with a server 130 or between devices (e.g., devices within system 100, a server 130 and system 100, a server 130 and a client device, etc.) in accordance with any number of formats or protocols, including XML, REST, SOAP, JSON, GraphQL, and the like. In some embodiments, data exchange may involve translating between formats or protocols.

Memory 186 may also include view randomization data 196, which may be used to generate randomization schemes, consistent with disclosed embodiments. In some embodiments, randomization data 194 may be user-configured, computer-configured (e.g., according to a model), or partially user-configured and partially-computer configured. In some embodiments, randomization data 194 may include data for managing groups of device (e.g., group definition data).

Memory 186 may also include a model (not shown), which may be an artificial intelligence (AI) model for managing testing data, such as through using local randomization schemes, consistent with disclosed embodiments. A model may be, without limitation, any one of a computer software module, an algorithm, a machine-learning model, a data model, a statistical model, a recurrent neural network (RNN) model, a long-short term memory (LSTM) model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After this interaction, the model may be updated to reflect the user interactions and/or machine inputs. Such updates may occur iteratively, such as periodically, in response to a combination of user inputs and/or machine inputs, etc.

Figure 3:
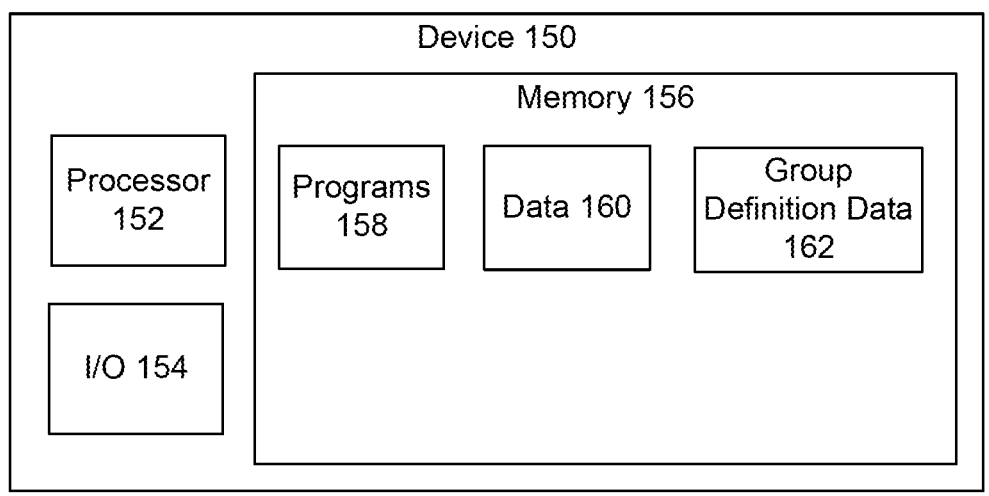
FIG. 3 illustrates an exemplary pictographic representation of a device for implementing testing data, consistent with disclosed embodiments.

FIG. 3 illustrates an exemplary pictographic representation of a device 150, which may carry out processes discussed herein. In some embodiments, device 150 may be a client device (e.g., client device 140a). Device 150 may include a processor 152, which may include any or all of the aspects of processor 172, consistent with disclosed embodiments. In some embodiments, device 150 may also include input/output devices (I/O) 154, which may include an input device or output device, such as those discussed with respect to server 130 (e.g., a touchscreen, a display, etc.). Device 150 may also include a sensor (not shown), such as an accelerometer, a light sensor, an audio sensor, an infrared sensor, a motion sensor, a piezoelectric sensor, a laser sensor, a sonar sensor, a GPS sensors, an electromagnetic sensor, and the like.

Device 150 may also include memory 156, which may include any or all of the aspects of memory 186, and which may store instructions usable by processor 152 to perform functions related to the disclosed embodiments. For example, memory 156 may include operation code (e.g., operating system code, application operation code, etc.) according to which an application may run on device 150. In some embodiments, operation code may be updated using an application store. As another example, memory 156 may store programs 158, which may have any or all of the aspects of programs 188, consistent with disclosed embodiments. For example, programs 158 may include an application configured to display user interfaces using testing data. Memory 156 may also include data 160, which may include a log, interaction data, data associated with implementing testing data at device 150, or any other data for use in the processes described herein. In some embodiments, data 160 may include data tracked at device 150 (e.g., by a program 158). For example, a program 158 may track actions taken at device 150 (a mouse click, button press, touchscreen interaction, transaction initiated, purchase made, webpage viewed, a download, etc.). By way of further example, a program 158 may track (e.g., using a browser extension, cookie, or the like) a user action taken in an Internet browser to view and/or interact with a user interface layer, and may store data containing details of views and/or interactions in data 160.

In some embodiments, memory 156 may include randomization scheme data 164, which may include data according to which a device 150 may implement testing data. For example, data 160 may include a probability, timing, algorithm, etc. which a device 150 may use to determine when and how to implement testing data (e.g., by displaying a particular user interface at device 150, outputting a particular audio output and/or haptic feedback output in response to a certain user input, etc.). Memory 156 may also include group definition data 162, which may include a group definition for a particular device 150. For example, group definition data 162 may identify a device 150 as belonging to a particular group of devices to which a particular testing dataset or sub-test dataset pertains. In some embodiments, a particular test or sub-test may only be carried out at a device 150 if that device 150 has group definition data 162 that permits it to implement that test and/or sub-test. In some embodiments, device 150 may include a listener (not shown), which may be part of programs 158.

Figure 4:
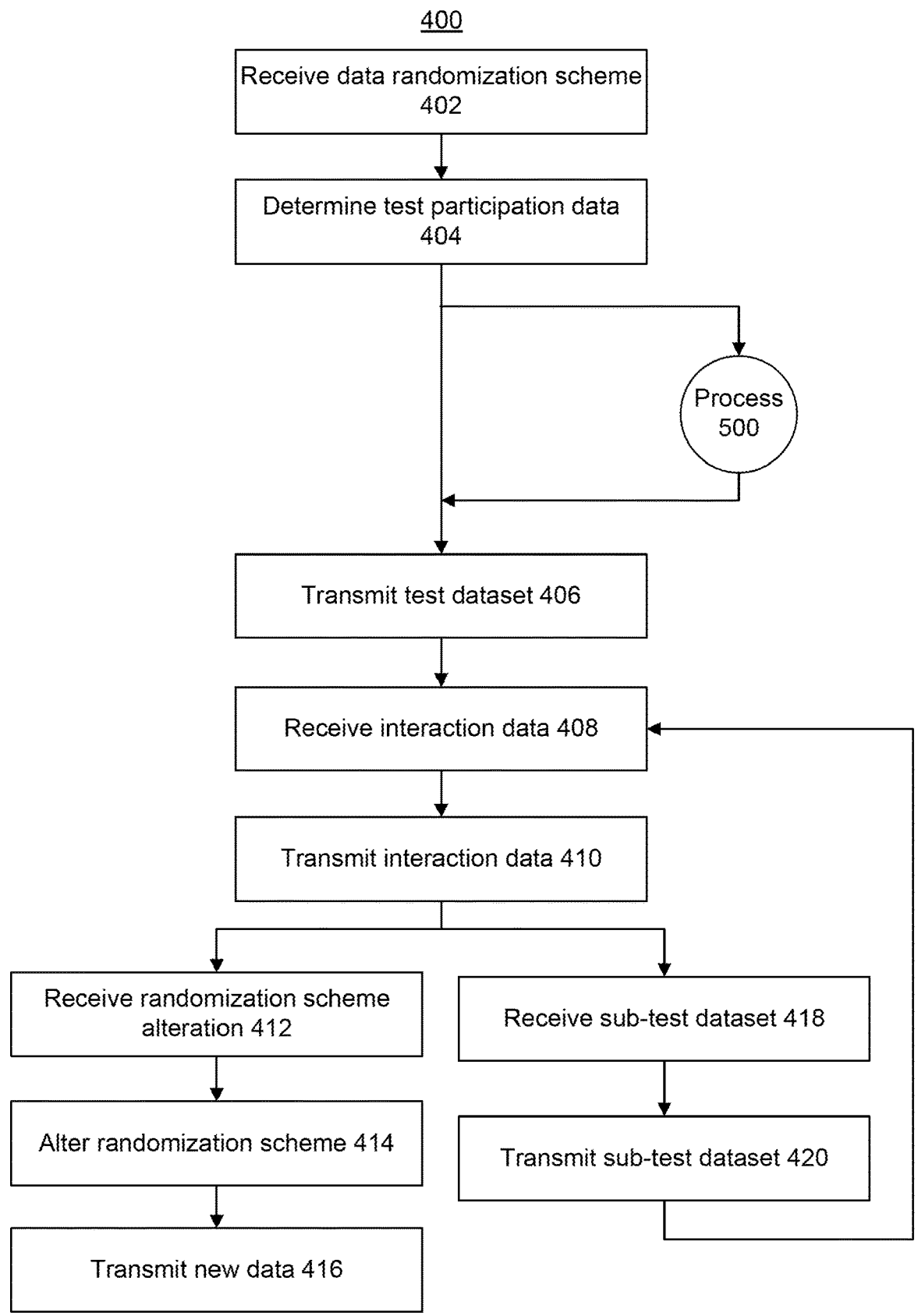
FIG. 4 illustrates an exemplary pictographic representation of a process for randomization scheme implementation, consistent with disclosed embodiments.

FIG. 4 illustrates an exemplary pictographic representation of a process for randomization scheme implementation, consistent with disclosed embodiments. For example, process 400 may be performed entirely or in part by at least one server 130 (e.g., using processor 172). Alternatively or additionally, some steps of process 400 may be performed by device 150 and other steps may be performed by another device, such as control device 102. While process 400 is described with respect to server 130, one of skill will understand that the steps illustrated in FIG. 4 are exemplary and steps may be added, merged, divided, duplicated, repeated, modified, and/or deleted in some embodiments. In some embodiments, some or all steps of process 400 may be performed using a client-facing service. In some embodiments, some or all steps of process 400 may be performed using a non-client-facing service.

At step 402, server 130 may receive a data randomization scheme. Merely by way of example, configuration manager device 104 may receive the data randomization scheme from randomizer device 106. In some embodiments, a data randomization scheme may be received periodically. Additionally or alternatively, a data randomization scheme may be received in response to a new data randomization scheme being generated and/or a data randomization scheme being updated (e.g., at randomizer device 106). In some embodiments, the data randomization scheme may be configured to cause a device (e.g. control device 102) to select a test dataset from among a plurality of test datasets. For example, a data randomization scheme may include an algorithm or probability distribution that a device may use to determine whether to implement a test or sub-test dataset at a client device.

At step 404, server 130 may determine test participation data (e.g., based on the data randomization scheme received at step 402). Test participation data may assign a user device to a particular test and/or assignment (e.g., sub-test, test modification, etc.). In some embodiments, server 130 may transmit test participation data according to a defined periodicity (e.g., every two hours, every day at 2:00 AM local time, etc.). In some embodiments, server 130 may perform all or part of process 500, discussed below, after performing step 404.

At step 406, server 130 may transmit a test dataset. In some embodiments, a test dataset may be based on test participation data. In some embodiments, server 130 may receive a test dataset from another device (e.g., a device within system 100). Server 130 may transmit a test dataset to a client device, such as client device 140*b*. In some embodiments, a test dataset may be transmitted together with test participation data (e.g. in a single transmission). In other embodiments, a test dataset (e.g., containing user interface configuration information) may be transmitted separately from test participation data (e.g., containing assignment information). In some embodiments, a test dataset may comprise data to be displayed at displays of a plurality of client devices. For example, a test dataset may include user interface configuration data (e.g., parameters of positioning, dimensions, colors, fonts, animations, etc. for displaying a user interface at a client device). In some embodiments, a test or plurality of tests (e.g., a first and a second test), as well as corresponding test datasets, may be associated with an application at a first and second plurality of client devices (e.g., a social media application). In some embodiments, user interface configuration data may include audio data (e.g., audio for output at the user device, which may be in response to a user input), haptic feedback data, etc.

In some embodiments, a test dataset and/or test participation data may be configured to be received by a program or application at a device. For example, a test dataset and/or test participation data may contain a data header or other identifier that a client device may detect (e.g., using a program or application), and upon detecting, may cause a client device to interact with the test dataset and/or test participation data (e.g., store the test participation data, display a user interface element according to the test dataset, etc.). In some embodiments, a test dataset and/or test participation data may be configured to be implemented by a client application (e.g., a program 158). For example, when a test dataset is associated with a particular application (e.g., a mobile shopping application), parameters of the test dataset and/or test participation data may be configured to implement a test or sub-test dataset within that application.

In some embodiments, a server 130 may transmit multiple test datasets that are associated with different tests, some of which may be mutually exclusive. In some embodiments, server 130 may select a test dataset from among a plurality of mutually exclusive tests. Two tests and/or test datasets may be mutually exclusive when a client device to which a test dataset, which may be associated with a test, is transmitted, is unable to implement both of the tests/test datasets (e.g., simultaneously). By way of example and without limitation, a first test dataset may cause a client device to display an animation in a bottom right corner of a display and a second test dataset may cause a client device to display a still frame in a bottom right corner of a display.

In some embodiments, a test dataset may be configured (e.g., by system 100) to track a user identifier or a device identifier, which may be associated with at least one of a plurality of devices. Tracking a user or device identifier may allow server 130 to track which datasets have been transmitted to and/or implemented on which client devices. In this manner, tracking a user identifier or a device identifier relative to a dataset may allow server 130 to prevent transmission of a dataset to a client device (e.g., because the client device maintains a mutually exclusive dataset).

At step 408, server 130 may receive interaction data, which may have been transmitted from a client device (e.g., client device 140*a*). Interaction data may indicate a degree of user interaction with a transmitted test dataset deployed to at least one client device. For example, interaction data may include actions taken at a client device that indicate a degree of user interaction with a user interface, which may have been displayed at the client device. For example, as discussed above, interaction data may indicate a number of user inputs to a user interface, a number of user inputs within an application, a frequency of input, an amount of screen time spent viewing a particular user interface, a type of user input on a user interface (e.g., a selection to transmit a purchase request), and/or that a client did not interact with a user interface. In some embodiments, interaction data may be associated with particular test data or/and sub-test data, which a client device may have used to deploy and/or re-configure user interfaces. For example, one set of interaction data may be first interaction data, server 130 may receive, from the at least one of a first plurality of client devices, second interaction data, which may be associated with one of the sub-test datasets deployed by the at least one client device.

At step 410, server 130 may transmit interaction data. For example, server 130 may transmit interaction data received at step 408. In some embodiments, server 130 may reformat, compress, and/or filter interaction data before transmitting it. For example, server 130 may filter interaction data by determining that some interaction data is stale (e.g., has an age beyond a permitted threshold) and/or is redundant (e.g., overlaps beyond a permitted threshold with other interaction data). In some embodiments, server 130 may transmit interaction data substantially simultaneously with receiving the interaction data, according to a predetermined interval, at a specified time, and/or when particular network conditions are satisfied (e.g., network bandwidth usage is below a threshold). In some embodiments, process 400 may proceed to either or both of steps 412 and 418 after step 410.

At step 412, server 130 may receive a randomization scheme alteration. For example, server 130 may receive a randomization scheme alteration from system 100, which may have been generated by, for example, a randomizer device 106. A randomization scheme alteration may include a change to a parameter of a randomization scheme, such as a new probability that a client device may implement a particular dataset. In some embodiments, a randomization scheme alteration may be generated in response to a user input (e.g., an input at control device 102). In other embodiments, a randomization scheme alteration may be generated automatically, such as in response to analysis of interaction data and/or using artificial intelligence. For example, a machine learning method may be applied to received interaction data, to iteratively change a randomization scheme based on analysis of performance of an altered randomization scheme and subsequent interaction data (e.g., using a recursive process).

At step 414, server 130 may alter a randomization scheme (e.g., according to the randomization scheme alteration received at step 412). Altering a randomization scheme may include adding, removing, and/or changing parameters of a randomization scheme. For example, a first randomization scheme may include a probability parameter directing that a client device has a 40% probability that it deploys a first test dataset, and a 60% probability that it deploys a second test dataset. By way of example, server 130 may alter this randomization scheme such that a client device has a 50% probability that it deploys the first test dataset and a 50% probability that it deploys the second test dataset (e.g., by altering test participation data, altering test datasets, transmitting new data to a client device, etc.).

At step 416, server 130 may transmit new data, which may be an altered (e.g., altered at step 414) test data set, altered test participation data (e.g., removing a user device from a particular test and/or assignment), etc. For example, server 130 may transmit altered test participation data (e.g., representing the new randomization scheme) to a plurality of devices. By way of further example, new test participation data and/or a new test dataset may be sent to a user device that has not implemented a previous test dataset (e.g., based on interaction data of the user device), to deploy a test according to the altered randomization scheme. In some embodiments, server 130 may re-format, compress, and/or filter test participation data before transmitting it. In some embodiments, server 130 may transmit test participation data substantially simultaneously with altering a randomization scheme, according to a predetermined interval, at a specified time, and/or when particular network conditions are satisfied (e.g., network bandwidth usage is below a threshold).

At step 418, server 130 may receive a sub-test dataset, which may be associated with a test dataset. By way of example, a test dataset may include instructions for displaying a particular string of text at a client device (e.g., instructions that a client device display or not display the string of text), and a sub-test dataset may include instructions for displaying the string of text in a particular color. For example, a sub-test dataset may only be configured for deployment by a client device that output particular data (e.g., a user interface, animation, text string, interactable user element, an audio output, a haptic feedback output, etc.) according to a test dataset. Either or both of a test dataset and a sub-test dataset may be configured for deployment at a client device according to a randomization scheme.

At step 420, server 130 may transmit a sub-test dataset (e.g., a sub-test dataset received at step 418). In some embodiments, server 130 may transmit a sub-test dataset to a group of devices that previously displayed a particular element using a test dataset. Server 130 may determine such a group of devices may examining log data, which may be received periodically, upon request, and/or according to a data transmission rule (e.g., transmit data when a network bandwidth usage is below a threshold). For example, upon receiving log data indicating that a first client device output (e.g., displayed) a first element using a test dataset, server 130 may designate the first client device as part of a first test group, and upon receiving log data indicating that a second client device displayed a second element using a test dataset, server 130 may designate the second client device as part of a second test group. Server 130 may transmit first sub-test data to client devices of the first test group, and may transmit second sub-test data to client devices of the second test group. Process 500 describes other details of this aspect.

In some embodiments, server 130 may aggregate interaction data (e.g., first and second interaction data), such as interaction data resulting from a test and interaction data resulting from a sub-test, interaction data resulting from two tests, etc. Server 130 or another device may provide interaction data (e.g., first and second interaction data) within a user interface, such as through a graph, chart, plot, heatmap, or other visualization. In some embodiments, a user interface may be dynamic and change in real-time (e.g., based on real-time interaction data received from client devices).

Figure 5:
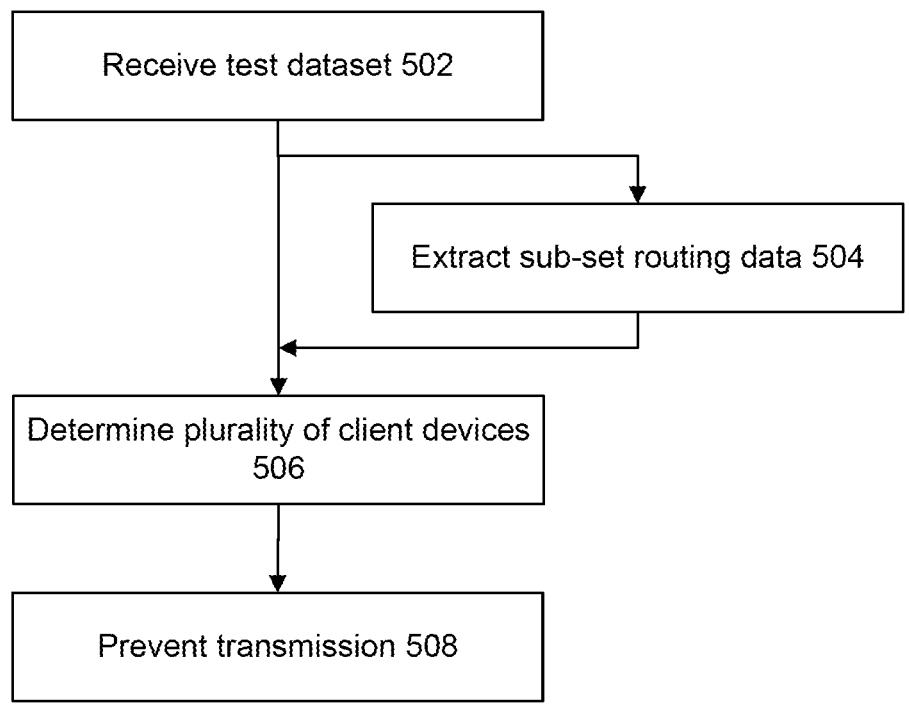
FIG. 5 depicts a flowchart of an exemplary process for blocking dataset transmissions, consistent with disclosed embodiments.

FIG. 5 depicts a flowchart of an exemplary process 500 for blocking dataset transmissions, consistent with disclosed embodiments. For example, process 500 may be performed entirely or in part by server 130 (e.g., using processor 172). Alternatively or additionally, some steps of process 500 may be performed by device 150 and other steps may be performed by another device, such as control device 102. While process 500 is described with respect to server 130, one of skill will understand that the steps illustrated in FIG. 5 are exemplary and steps may be added, merged, divided, duplicated, repeated, modified, and/or deleted in some embodiments.

At step 502, server 130 may receive a test dataset 502. In some embodiments, a test dataset 502 may be configured (e.g., at configuration manager device) to only be deployed by some client devices (e.g., client devices having particular device identifiers, client devices being associated with users having a predetermined set of characteristics (e.g., a frequency of usage of an application, a demographic, etc.), client devices not designated as part of a reserve group, etc.). In some embodiments a test dataset 502 may be configured (e.g., at configuration manager device) to only be deployed by some client devices according to parameters of a randomization scheme (e.g., the randomization scheme may include a parameter that only permits certain client devices to implement a particular dataset). In some embodiments, such as those where a received dataset is a sub-test dataset, server 130 may proceed to step 504. In other embodiments, such as those where a dataset is a test dataset (e.g., broader than a sub-test dataset), server 130 may proceed to step 506.

At step 504, server 130 may extract sub-test routing data. Sub-test routing data may be extracted from a test dataset and/or other dataset received by server 130. In some embodiments, sub-test routing data may include identifiers of client devices to which a sub-test dataset should be sent (e.g., client devices determined to have previously displayed a particular element, client devices determined to have had a threshold amount of interaction with a particular element, etc.). For example, an identifier of a client device may include a user account identifier, a MAC address, an IP address, a serial number, and/or any identifier that may be used to differentiate one client device from another.

At step 506, server 130 may determine a plurality of client devices, which may be a plurality of client devices to which a dataset (e.g., a test dataset received at step 502) may be transmitted. In some embodiments, the determined plurality of client devices is a first plurality, and server 130 may select the first plurality of client devices (e.g., to which it will transmit a dataset). In some embodiments, the first plurality may be selected based on network traffic information. For example, devices having lower latency with respect to server 130 may be selected as part of the first plurality. As another example, devices with a lower hop count (e.g., between IP nodes) may be selected as part of the first plurality.

For example, server 130 may access a test dataset for a first test intended for a first plurality of devices, and may determine that a second plurality of devices is designated as a holdout group (e.g., is designated for a second test). Server 130 may determine a plurality of client devices that are not designated as part of a holdout group (e.g., according to data received from system 100), and may transmit a dataset to those devices. In some embodiments, server 130 may determine that a second test conflicts with the first test, and may send test datasets associated with the first and second tests, respectively, to different and/or separate pluralities of client devices.

In some embodiments, server 130 may determine a plurality of client devices based on sub-test routing data. For example, sub-test routing data may indicate that a sub-test dataset should only be sent to a designated group of client devices. By way of further example, a first test may be associated with at least one sub-test (e.g., a sub-test only relevant to, or compatible with, devices that received and/or implement a test dataset for the first test). Server 130 may transmit at least one sub-test dataset, which may be configured for deployment by a first plurality of client devices (e.g., devices that received and/or implement a test dataset for the first test) and/or associated with the at least one sub-test, to the first plurality of client devices.

At step 508, server 130 may prevent transmission, such as transmission of a dataset to a client device. For example, server 130 may only transmit (e.g., at step 406) a dataset to certain client devices. For example, server 130 may prevent transmission of a dataset (e.g., test dataset) to a second plurality of client devices (e.g., after selecting a first plurality of client devices). In some embodiments, server 130 may also prevent transmission based on a second plurality of client devices being designated as a holdout group. In some embodiments, server 130 may prevent transmission (e.g., of a first test) to a second plurality of client devices based on a second test being queued for sending to a second plurality of client devices.

In some embodiments, server 130 may maintain a look-up table (LUT) or other data structure holding device or user identifiers, which may be stored locally at server 130, or another device, such as a device within system 100 or a database. The data structure may maintain list of identifiers of users and/or devices designated as a destination list for the transmission of the transmitted test datasets. In some embodiments, server 130 may determine (e.g., using a LUT) device or user identifiers associated with a plurality of client devices, and may remove a determined device or user identifiers from a list.

As another example, server 130 may modify a parameter of a randomization scheme to block some client devices from implementing a dataset and may transmit such a modified dataset to a client device other than a blocked client device. As yet another example, server 130 may modify a test dataset, such that only some client devices may be able to locally implement it (e.g., by performing a signature operation on the dataset, such that only certain client devices, such as those having a particular key or configuration, may be able to reverse the signature operation).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer programs based on the written description and methods of this specification are within the skill of a software developer. The various functions, scripts, programs, or modules can be created using a variety of programming techniques. For example, computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages (including an object oriented programming language and/or conventional procedural programming language) such as Smalltalk, C++, JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively for any number of iterations, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Moreover, while exemplary embodiments have been described herein, these have been presented for purposes of illustration, but are not intended to be exhaustive or limited to the embodiments disclosed, such that the scope includes any and all embodiments having equivalent elements, modifications, variations, omissions, combinations (e.g., of aspects across various embodiments), adaptations or alterations, without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A server for distributing user requests, the server comprising:
   a network interface;
   at least one processor; and
   a non-transitory computer-readable medium containing a set of instructions that, when executed by the at least one processor, cause the at least one processor to perform operations comprising:
   receiving from a local network device, without requesting, a data randomization scheme determining a test dataset from among a plurality of test datasets for deployment at a client device;
   based on the received data randomization scheme, determining test participation data for transmitting to a plurality of client devices;
   transmitting the test participation data to the plurality of client devices;
   transmitting, to the plurality of client devices, the test datasets configured for deployment by the plurality of client devices according to the test participation data; and receiving, from at least one of the plurality of client devices, interaction data associated with one of the test datasets deployed by the at least one client device according to the test participation data.

2. The server of claim 1, wherein the data randomization scheme is received according to a defined periodicity.

3. The server of claim 1, wherein the server is configured to receive the interaction data using a listener.

4. The server of claim 1, wherein the transmitted test datasets are configured to be implemented by a client application.

5. The server of claim 1, wherein:
the transmitted test datasets are associated with a test; and
the operations further comprise selecting the test from among a plurality of mutually exclusive tests.

6. The server of claim 5, wherein the transmitted test datasets are configured to track a user identifier or a device identifier, associated with the at least one of the plurality of client devices.

7. The server of claim 5, wherein:
the plurality of client devices is a first plurality;
the operations further comprising:
selecting the first plurality of client devices; and
preventing the transmission of the test datasets to a second plurality of client devices.

8. The server of claim 7, wherein preventing the transmission of the transmitted test datasets comprises:
determining device or user identifiers associated with the second plurality of client devices; and
removing the determined device or user identifiers from a list of identifiers designated as a destination list for the transmission of the transmitted test datasets.

9. The server of claim 7, wherein the first plurality is selected based on network traffic information.

10. The server of claim 7, wherein:
the test is a first test; and
preventing the transmission is based on the second plurality of client devices being designated as a holdout group.

11. The server of claim 10, wherein the first test is associated with at least one sub-test, the operations comprising transmitting sub-test datasets configured for deployment by the first plurality of client devices and associated with the at least one sub-test to the first plurality of client devices.

12. The server of claim 11, wherein the interaction data is first interaction data, and the operations further comprise receiving, from the at least one of the first plurality of client devices, second interaction data associated with one of the sub-test datasets deployed by the at least one client device.

13. The server of claim 12, the operations further comprising:
aggregating the first and second interaction data; and
providing the first and second interaction data within a user interface.

14. The server of claim 7, wherein:
the test is a first test; and
preventing the transmission is based on a second test being queued for sending to the second plurality of client devices.

15. The server of claim 14, the operations further comprising determining the second test to conflict with the first test.

16. The server of claim 14, wherein the transmitted test datasets comprise data to be displayed at displays of the first plurality of client devices.

17. The server of claim 14, wherein the first and second tests are both associated with an application at the first and second pluralities of client devices.

18. The server of claim 1, wherein the interaction data indicates a degree of user interaction with one of the transmitted test datasets deployed at the at least one client device.

19. A computer-implemented method for distributing user requests comprising:
receiving, at a first local network device and from a second local network device, without requesting, a data randomization scheme determining a test dataset from among a plurality of test datasets for deployment at a client device;
based on the received data randomization scheme, determining test participation data for transmitting to a plurality of client devices;
transmitting the test participation data to the plurality of client devices;
transmitting, to the plurality of client devices, the test datasets configured for deployment by the plurality of client devices according to the test participation data; and
receiving, from at least one of the plurality of client devices, interaction data associated with one of the test datasets deployed by the at least one client device according to the test participation data.

20. A server for distributing user requests, the system comprising:
a network interface;
a first local network device comprising:
at least one processor; and
a non-transitory computer-readable medium containing a set of instructions that, when executed by the at least one processor, cause the at least one processor to perform operations comprising:
transmitting, in response to receiving a new or updated data randomization scheme, the new or updated data randomization scheme to a second network device, the new or updated data randomization scheme determining a test dataset from among a plurality of test datasets for deployment at a client device; and
a second local network device comprising:
at least one processor; and
a non-transitory computer-readable medium containing a set of instructions that, when executed by the at least one processor, cause the at least one processor to perform operations comprising:
receiving the new or updated data randomization scheme;
based on the received data randomization scheme, determining test participation data for transmitting to a plurality of client devices;
transmitting the test participation data to the plurality of client devices;
selecting a test from among a plurality of mutually exclusive tests;
transmitting, to the plurality of client devices, test datasets configured for deployment by the plurality of client devices according to the transmitted test participation data, the test datasets being associated with the test and the test being associated with a sub-test;
receiving, from at least one of the plurality of client devices, first interaction data associated with one of the test datasets deployed by the at least one client device according to the test participation data;
transmitting, based on the first interaction data, sub-test datasets configured for deployment by the plurality of client devices and associated with the sub-test to the plurality of client devices; and receiving, from the at least one of the plurality of client devices, second interaction data associated with one of the sub-test datasets deployed by the at least one client device.

\* \* \* \* \*